(12) United States Patent
Thompson

(10) Patent No.: US 10,093,216 B2
(45) Date of Patent: Oct. 9, 2018

(54) METHOD AND APPARATUS FOR CONTROLLING A MATERIAL EJECTOR SYSTEM

(71) Applicant: CATERPILLAR SARL, Geneva (CH)

(72) Inventor: Stephen Thompson, Sunderland (GB)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 14/778,148

(22) PCT Filed: Mar. 18, 2013

(86) PCT No.: PCT/EP2013/055591
§ 371 (c)(1),
(2) Date: Sep. 18, 2015

(87) PCT Pub. No.: WO2014/146683
PCT Pub. Date: Sep. 25, 2014

(65) Prior Publication Data
US 2016/0052439 A1    Feb. 25, 2016

(51) Int. Cl.
*B65B 21/02*    (2006.01)
*B60P 1/00*    (2006.01)

(52) U.S. Cl.
CPC .................................. *B60P 1/006* (2013.01)

(58) Field of Classification Search
CPC .................. H01L 21/67772; B60P 1/6454
USPC ................... 414/409, 517, 521, 810, 812
See application file for complete search history.

(56) References Cited

U.S. PATENT DOCUMENTS

| 1,927,653 A | 9/1933 | Wehr |
| 2,663,439 A | 12/1953 | Phelps |
| 4,627,783 A * | 12/1986 | De Filippi ............... B65F 3/28 100/229 A |
| 2004/0173088 A1 | 9/2004 | Burnett et al. |
| 2006/0104404 A1 | 5/2006 | Blackburn et al. |
| 2006/0170168 A1 * | 8/2006 | Rotz .................. B60G 17/0155 280/5.501 |
| 2008/0197219 A1 * | 8/2008 | Moriwaki ............. B07C 5/3422 241/19 |
| 2012/0086185 A1 * | 4/2012 | Kerr ......................... B60P 1/28 280/433 |

(Continued)

FOREIGN PATENT DOCUMENTS

| CA | 1032568 | 6/1978 |
| DE | 415 069 C | 6/1925 |

(Continued)

OTHER PUBLICATIONS

International Search Report dated Dec. 4, 2013 from Application No. PCT/EP2013/055591.

*Primary Examiner* — Saul Rodriguez
*Assistant Examiner* — Willie Berry, Jr.
(74) *Attorney, Agent, or Firm* — Baker Hostetler Hibshman Claim Construction PLLC

(57) ABSTRACT

The present disclosure relates to the spreading of a material by pushing the material from the back of a vehicle using a material ejector system while the vehicle is moving. The depth of the spread material and how evenly it is spread is dependent on a number of factors that can be difficult and complicated for an operator of the vehicle control. In the present disclosure the speed at which the material is ejected from the vehicle is set on the basis of a measured speed of the vehicle.

4 Claims, 4 Drawing Sheets

(56) References Cited

U.S. PATENT DOCUMENTS

2012/0282026 A1* 11/2012 Atherton ................ E01C 19/15
404/82

FOREIGN PATENT DOCUMENTS

| DE | 20 2007 011 417 U1 | 5/2008 |
|----|--------------------|--------|
| DE | 20 2008 014 060 U1 | 1/2009 |
| EP | 2 172 364 A2 | 4/2010 |

* cited by examiner

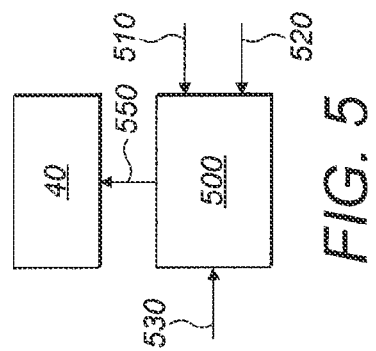
FIG. 5
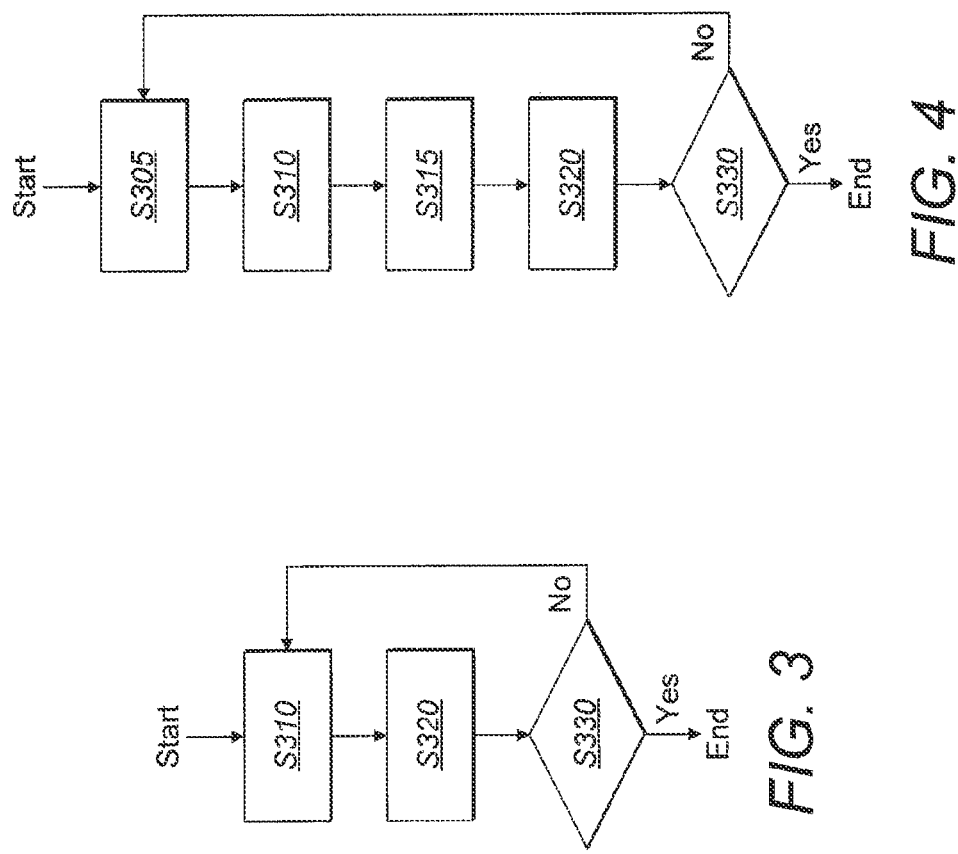
FIG. 4
FIG. 3

METHOD AND APPARATUS FOR CONTROLLING A MATERIAL EJECTOR SYSTEM

CROSS-REFERENCE TO RELATED APPLICATIONS

This application is a National Stage of International Patent Application No. PCT/EP2013/055591, filed Mar. 18, 2013, the content of which is incorporated herein by reference in its entirety.

TECHNICAL FIELD

The present disclosure relates to a method and apparatus for controlling a material ejector system.

BACKGROUND

Vehicles that are adapted to carry load material may eject the material by raising the front end of the load area so that the material slides down the load area off the rear of the vehicle. However, raising the load area raises the centre of gravity of the vehicle and therefore reduces the stability of the vehicle so that ejection of the material whilst the vehicle is moving, particularly when moving on inclines, side slopes or soft ground, may not safely be achieved.

Alternatively, the material may be ejected from the vehicle using an ejector blade that moves along the bed of the load area from the front to the rear, pushing material out of the rear of the vehicle. Because the centre of gravity of the vehicle is not raised by the operation of the ejector mechanism, it may be possible to eject the material whilst the vehicle is moving. This may be particularly useful where the material needs to be spread across the ground along which the vehicle is travelling, for example in road building operations. By spreading the material at the time of ejecting it from the vehicle, the subsequent need for material spreading apparatus, such as bulldozers, may be reduced allowing for faster cycle times and reduced costs.

US 2004/0173088 describes a vehicle with an ejector blade that moves along the bed of the load area in order to eject material from the rear of the vehicle. The ejector blade is driven by a hydraulic multistage cylinder, wherein each cylinder has a different fluid volume. The vehicle is arranged such that an operator inputs a desired ejector blade speed and a control system ensures that that chosen ejector blade speed is maintained, regardless of the cylinder that is currently driving the ejector blade. If the vehicle operator maintains a constant vehicle speed, the ejected material may be spread evenly on the ground. However, this requires the operator to control the vehicle speed carefully, which increases the difficulty of vehicle operation. Furthermore, when the vehicle operator is unable to maintain the vehicle speed, for example because an obstruction necessitates a reduction in speed, or an incline results in a reduction in speed, the material may no longer be spread evenly.

SUMMARY

The present disclosure provides a method for controlling a material ejector system comprising an ejector for ejecting a material from a bed of a vehicle, the method comprising the step of: setting a speed of the ejector relative to the bed of the vehicle on the basis of a measured speed of the vehicle.

The present disclosure also provides a controller for controlling a material ejector system comprising an ejector for ejecting from a bed of a vehicle a material, the controller being arranged to: set a speed of the ejector relative to the bed of the vehicle on the basis of a measured speed of the vehicle.

BRIEF DESCRIPTION OF THE DRAWINGS

A method and apparatus for controlling a material ejector system is described by way of example only with reference to the accompanying drawings, in which:

FIG. 3 shows a control process by which the speed of the ejector blade in FIGS. 1 and 2 may be controlled, in accordance with an aspect of the present disclosure;

FIG. 4 shows a control process by which the speed of the ejector blade in FIGS. 1 and 2 may be controlled, in accordance with a further aspect of the present disclosure;

FIG. 5 shows a schematic representation of a controller for controlling the material ejector system of FIGS. 1 and 2.

DETAILED DESCRIPTION

Figure 1:
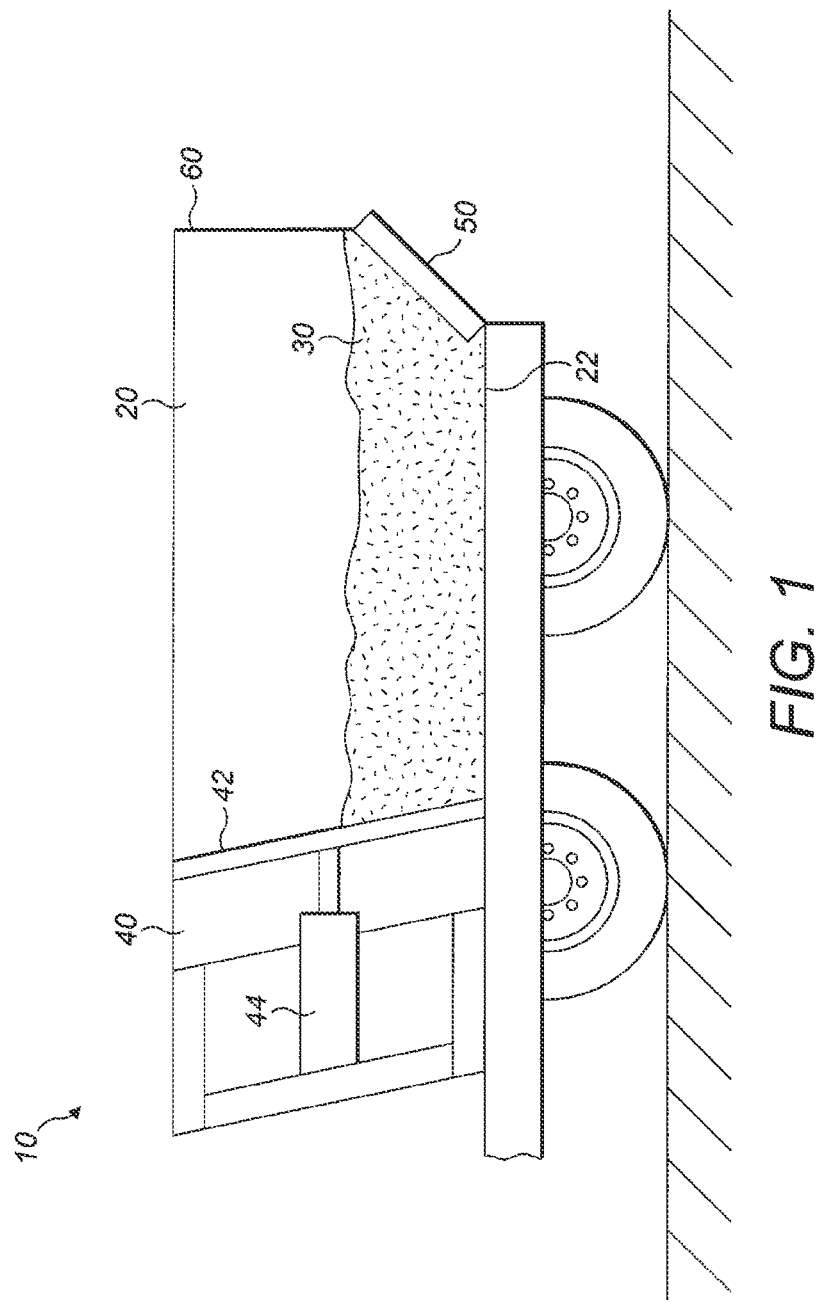
FIG. 1 shows a partial cross-section of a vehicle with a material ejector system before material is ejected, the material ejector system comprising an ejector blade and hydraulic system.

FIG. 1 shows a vehicle 10 with a material ejector system 40 for ejecting material 30 that is located in a material container 20. The vehicle 10 may be one with powered wheels, for example a truck, or unpowered wheels, for example a trailer designed to be towed by another vehicle with powered wheels. In the configuration shown in FIG. 1, ejection of the material 30 from the material container 20 has not yet begun. As such, a door 50 is in the closed position in order to help retain the material 30 within the material container 20, and the material ejector system 40 is in its home position. Whilst the vehicle 10 is moving from site to site it may be retained in the configuration shown in FIG. 1 so that the material 30 is kept on the vehicle 10.

The material ejector system 40 may comprise an ejector blade 42 and a hydraulic multistage cylinder 44 that is arranged to move the ejector blade 42 from the home position shown in FIG. 1 towards a rear 60 of the material container 20 in order to eject material 30 from the material container 20. The ejector blade 42 may be arranged to sit on top of a bed 22 of the material container 20 so that when the ejector blade 42 is moved towards the rear 60 of the material container 20, the ejector blade 42 may push all of the material 30 that is resting on top of the bed 22 towards the rear of the material container 20.

Figure 2:
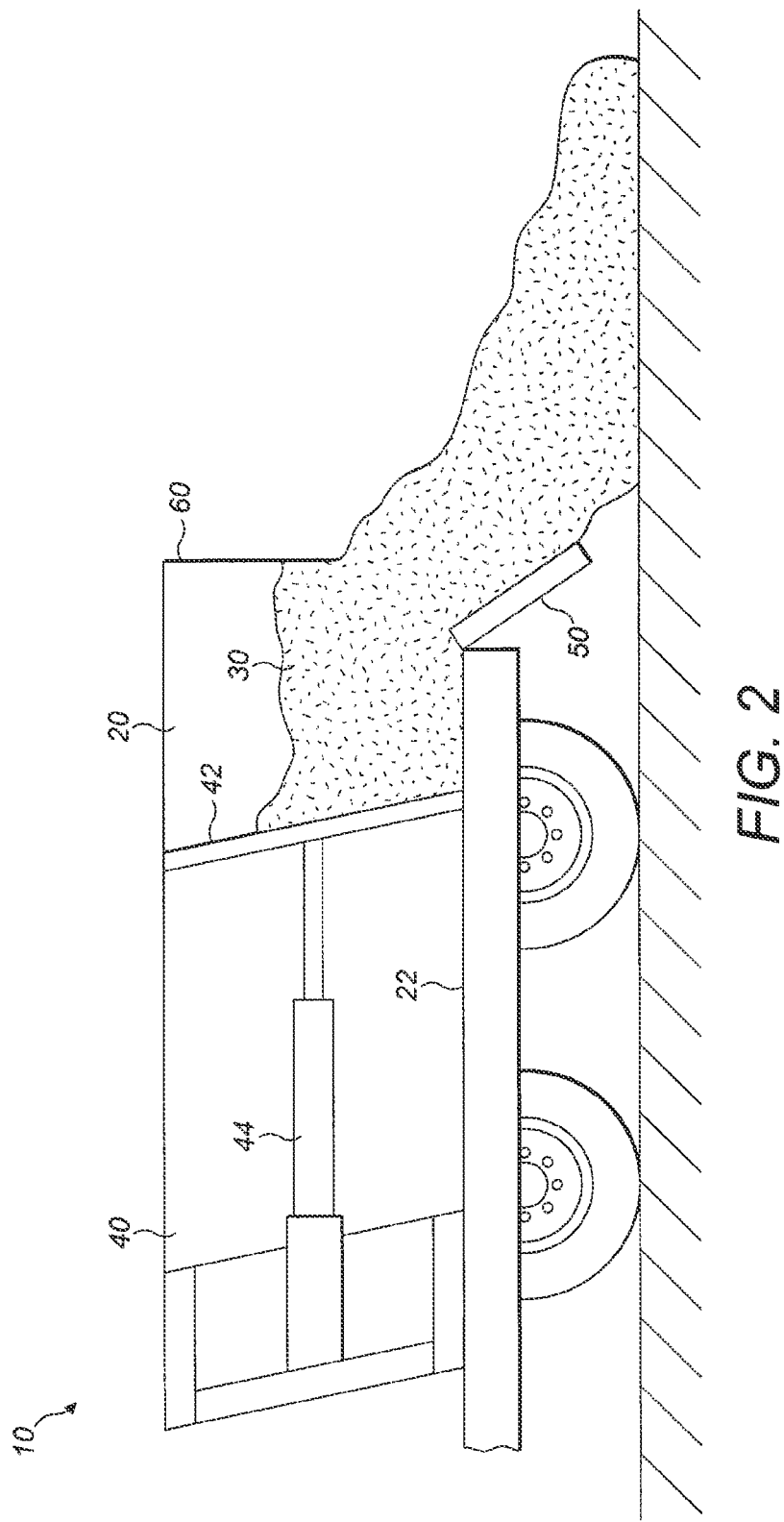
FIG. 2 shows a partial cross-section of the vehicle of FIG. 1, wherein the material ejector system is part way through material ejection.
Figure 6:
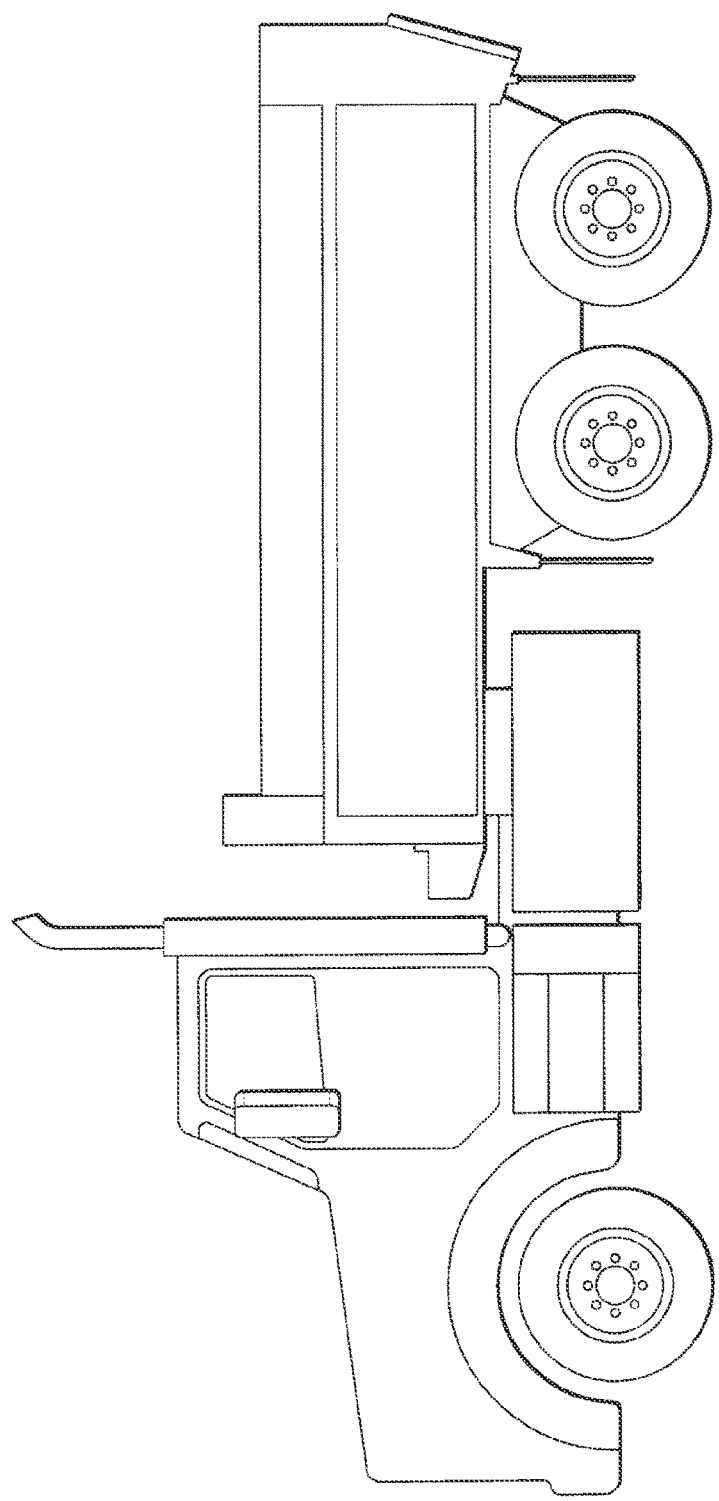
FIG. 6 shows a vehicle within which the material ejector system of FIGS. 1 and 2 may be used.

FIG. 2 shows the vehicle 10 during ejection of the material 30 by the material ejector system 40. The door 50 is in an open position so that material 30 may be ejected from the rear 60 of the material container 20 onto the ground. The hydraulic multistage cylinder 44 is in an extended position, which has pushed the ejector blade 42 along the bed 22 towards the rear 60 of the material container 20. As the ejector blade 42 is pushed by the hydraulic multistage cylinder 44 along the bed 22, material 30 is pushed by the ejector blade 42 out of the rear 60 of the material container 20 and onto the ground.

The hydraulic multistage cylinder 44 may be of any type that is well known to the person skilled in the art. For example, it may comprise three cylinder stages, each with a different fluid volume. Fluid may be pumped into the hydraulic multistage cylinder 44, forcing the hydraulic multistage cylinder 44 to extend. Each cylinder within the hydraulic multistage cylinder 44 may be driven by the fluid and extend in turn, such that after a first cylinder has reached its full extension, a second cylinder begins to extend until all of the cylinders have reached their full extension. Because each cylinder may have a different volume, the speed of extension for a particular volume flow rate of fluid into the hydraulic multistage cylinder 44 may result in a different speed of extension depending upon which cylinder is being driven by the fluid at the time.

The fluid may be pumped into the hydraulic multistage cylinder 44 using a variable displacement pump driven by an engine. Where the vehicle itself comprises an engine, for example for driving the vehicle wheels, the pump may be driven by that same engine, or a different engine. Where the vehicle does not have any driven wheels, for example it is a trailer, the engine may be an engine specifically for driving the pump, or it may be located elsewhere, for example on a vehicle towing the ejector vehicle. The volume flow rate out of the variable displacement pump and into the hydraulic multistage cylinder 44 may be controlled by a combination of the engine speed and a swash plate angle within the pump. At greater swash plate angles, more fluid may be allowed to leave the pump and enter the hydraulic multistage cylinder 44, resulting in a greater fluid flow rate and therefore a faster hydraulic multistage cylinder extension speed. Likewise, at greater engine speeds, the volume flow rate of fluid out of the pump and into the hydraulic multistage cylinder 44 may be increased, again resulting in a faster hydraulic multistage cylinder extension speed. Therefore, the speed of extension, and consequently the speed of the ejector blade 42 relative to the material container 20, may be controlled to achieve a desired speed by adjusting the swash plate angle of the variable displacement pump on the basis of the current engine speed and the volume of the cylinder currently being driven by the fluid.

When material 30 is being ejected from the material container 20, the vehicle 10 may be moving forwards so that the material 30 may be spread over an area of the ground. The speed of the ejector blade 42 relative to the material container 20 determines how quickly the material 30 may be ejected from the material container 20 onto the ground. The amount of material 30 that is ejected from the material container 20 per unit time is one of the factors that determines how thickly and evenly the material 30 is spread on the ground. A further factor in how thickly and evenly the material 30 is spread on the ground is the speed of the vehicle 10 relative to the ground.

For example, if the speed of the vehicle 10 relative to the ground is constant, a faster material ejection rate will result in the material 30 being spread less thickly on the ground. Any changes in the material ejection rate may result in the thickness of the material 30 on the ground changing and therefore an uneven spreading of the material 30.

However, if the material ejection rate is constant, a slower vehicle speed relative to the ground may result in the material 30 being spread more thickly on the ground. Any changes in the speed of the vehicle 10 relative to the ground may result in the thickness of the material 30 on the ground changing and therefore an uneven spreading of the material 30.

FIG. 3 shows a control process which may be used to control the thickness and evenness of the material spreading. The control process may be initiated when the operator indicates that they would like to begin spreading the material 30, for example by using a control interface, for example a button, switch or touch screen icon.

In Step S310, the speed of the vehicle 10 relative to the ground may be determined using any technique well known to the skilled person.

In Step S320, the speed of the ejector blade 42 relative to the material container 20 is set on the basis of the speed of the vehicle. The speed of ejector blade 42 that is required in order to maintain a consistent material depth for any vehicle speed may be known from experimental data. For example, from experimental data, the relationship between the vehicle speed and the ejector blade speed that results in even spreading of the material 30 may be derived so that a formula using vehicle speed as a variable may be used for setting the ejector blade speed. Alternatively, a look-up table may be used wherein the vehicle speed is used as an input to the look-up table and the required ejector blade speed is read out.

An ejector blade speed may be set by controlling the rate of injection of fluid into the hydraulic multistage cylinder 44. This may be carried out as explained above by setting a suitable swash plate angle in the variable displacement pump driving the hydraulic multistage cylinder 44 so that for the current engine speed and the volume of the cylinder currently being driven, a desired rate of injection of fluid into the hydraulic multistage cylinder 44, and therefore a desired ejector blade speed, is achieved.

Thus, when the operator indicates that they would like to begin material spreading, the speed of the vehicle will be identified and the ejector blade speed set accordingly. Thus, if for example the vehicle is already moving at the time the operator indicates that they would like to begin material spreading, the current vehicle speed is identified, from which a suitable ejector blade speed is determined and then set.

Having set the ejector blade speed in Step S320, it may then be determined in Step S330 whether or not the ejector blade 42 is at the end of its travel. The ejector blade 42 may be at the end of its travel when it can go no further towards the rear 60 of the vehicle and so no more material 30 can be ejected. This may occur when the hydraulic multistage cylinder 44 is fully extended. It may be determined that the hydraulic multistage cylinder 44 is at the end of its travel by identifying a spike in the fluid pressure within the hydraulic multistage cylinder 44. This spike may be caused by fluid still being pumped into the hydraulic multistage cylinder 44 after the hydraulic multistage cylinder 44 has reached the end of its travel.

If it is determined that the ejector blade 42 is at the end of its travel, the control process shown in FIG. 3 ends, after which the fluid may be pumped out of the hydraulic multistage cylinder 44 to return the ejector blade 42 to the home position.

If, however, it is determined that the ejector blade 42 is not at the end of its travel, the control process may return to Step S310 so that any changes in the vehicle speed will be picked up by the control process, which may then change the ejector blade speed in Step S320 in order to maintain a consistent material depth. Thus, changes in vehicle speed may be compensated for by changing the ejector blade speed, thereby keeping the spread material depth consistent.

Alternatively, an operator may signal that material spreading is to be concluded before the hydraulic multistage cylinder 44 has reached the end of its travel, at which time the control process shown in FIG. 3 may end and the ejector blade 42 may be returned to its home position.

The speed of the vehicle 10 may be maintained within predefined limits using a cruise control system. When such a system is operating, it may be unlikely that the resultant small variations in vehicle speed allowable by the cruise control would necessitate significant changes in the speed of the ejector blade 42 relative to the material container 20. Therefore, it may be likely that when cruise control is in operation, the speed of the ejector blade 42 may remain constant. However, the operator may still adjust the speed at which the cruise control is holding the vehicle 10. For example, the operator may apply the vehicle brakes, or depress the vehicle throttle, resulting in a new vehicle speed that the cruise control then maintains. If such an event occurs, the above described ejector blade speed control process may identify the change in vehicle speed and adjust the ejector blade speed accordingly in order to maintain a consistent, even material spreading.

Alternatively, the speed of the vehicle 10 may be manually controlled by the operator using the vehicle brakes and throttle. In this instance, the vehicle speed may vary more often and to a greater degree, in which case the above described ejector blade speed control process may be expected to make more changes in ejector blade speed in order to maintain a consistent, even material spread.

FIG. 4 shows a modification of the control process shown in FIG. 3. The control process of FIG. 4 has additional Step S305 where an operator input setting that sets a desired material depth may be reviewed. The desired material depth setting may merely be approximate, for example shallow, medium or deep, or it may be more exact, for example 2 cm, 3 cm or 5 cm.

This setting may be used as a further factor, in addition to the vehicle speed, in setting the ejector blade speed. For example, if the operator desires a thick material depth, the ejector blade speed may be set faster and if the operator desires a thinner material depth, the ejector blade speed may be set slower.

Thus, if the operator changes the desired material depth setting during material spreading, the control process may adjust the ejector blade speed accordingly.

The control process of FIG. 4 also has additional Step S315 where the current ejector blade speed may be determined. By determining the current ejector blade speed, feedback may be introduced into the control process.

Either or both of Steps S305 and S315 may be implemented as a modification of the control process of FIG. 3.

The ejector blade speed may be determined a number of different ways. A first technique may be to attach one end of a line to the ejector blade 42 and the other end of the line to a cable reeling drum/potentiometer.

An alternative technique may be to attach a linear transducer inside or on the outside of the hydraulic multistage cylinder 44 and use an output of the transducer to determine the speed of the ejector blade.

A further alternative technique may be to use non-contact speed measurement tools, for example an optical device arrangement, such as an infra-red or laser system. The system may be arranged to transmit light from an optical emitter, for example an infra-red light emitter or laser light emitter, onto the ejector blade 42 and measure the reflected light using an optical receiver, for example an infra-red light receiver or a laser light receiver, in order to determine the position of the ejector blade 42 and from any change in position of the ejector blade 42 with time also the speed of the ejector blade 42. Alternatively, the same optical arrangement may use other effects, such as the Doppler effect, to determine the speed of the ejector blade 42.

A further alternative technique may be to consider the operating conditions of the hydraulic multistage cylinder 44, such as the volume flow rate of fluid into the hydraulic multistage cylinder 44. This may be determined from measuring the engine speed and the swash plate angle of the variable displacement pump driving the hydraulic multistage cylinder 44 and knowing the volume of the cylinder being driven. For example, the position of the ejector blade 42 may be determined from how much fluid has been pumped into the hydraulic multistage cylinder 44. The amount of fluid pumped into the hydraulic multistage cylinder 44 may be identified from recording the swash plate angle and the engine speed during the entire material ejection process. For any given hydraulic multistage cylinder 44, its degree of extension will be known from the amount of fluid that has been injected into it.

By identifying the degree of extension of the hydraulic multistage cylinder 44, it may be known which of the cylinders within the hydraulic multistage cylinder 44 is currently being driven by the injected fluid. Once it is known which cylinder is being driven, the current volume flow rate of fluid going into the hydraulic multistage cylinder 44 may be used to identify the speed at which the hydraulic multistage cylinder 44 is currently extending and therefore the speed of the ejector blade 42. The current volume flow rate of fluid may be determined from the current swash plate angle and the current engine speed.

Therefore, by measuring the swash plate angle and the engine speed throughout the ejection process, the current speed of the ejector blade 42 may be determined and then used as feedback in controlling the ejector blade 42 setting.

The measured ejector blade speed may be used as a further factor, in addition to the vehicle speed and in some arrangements also the material thickness setting, in setting the ejector blade speed. For example, if the measured ejector blade speed is less than the ejector blade speed required to maintain a desired thickness, the ejector blade speed may be set higher by the control process in order to correct the error.

Having performed Step S315, the control process may perform Steps S320 and S330 as described in respect of FIG. 3 above. In this way, if ejection is still taking place, any changes in desired material thickness (Step S305) and/or measured ejector blade speed (Step S315) may be identified and have an effect on the control of the ejector blade speed.

FIG. 5 shows a controller 500 that may be used to carry out the control processes described above. The controller 500 may have input signals, which comprise a measurement of the vehicle speed 510. The controller 500 may also have further inputs comprising at least one of, a measured engine speed 520 and a desired material depth setting 530. The controller 500 may then set the speed of the ejector blade 42 relative to the material container 20 by setting, using the control signal 550, a swash plate angle of a variable displacement hydraulic pump in the material ejector system 40.

The controller 500 may be implemented as part of an engine control unit, for example Caterpillar A5N2, or as a standalone controller.

The skilled person will readily appreciate that a number of alternatives to the above described aspects of the disclosure may be implemented. For example rather than the controller 500 receiving an engine speed 530 measurement for calculation of the ejector blade speed, the controller 500 may instead receive a signal from a cable reel drum/potentiometer or an optical system in order to determine the speed of the ejector blade 42 relative to the material container 20.

Furthermore, whether or not the ejector blade 42 is at the end of its travel may be determined without considering the pressure of the fluid within the hydraulic multistage cylinder 44. Because the position of the ejector blade 42 may be identified at the same time as determining the speed of the ejector blade 42, using for example a cable reeling drum/potentiometer or an optical system or from measuring the engine speed and the swash plate angle, it may also be determined whether or not the ejector blade 42 is at the end of its travel.

Furthermore, the hydraulic multistage cylinder 44 may have any number of cylinder stages, including just a single cylinder stage. Where there are two or more cylinders, the cylinders may each extend in turn, as described above, or they may all extend by equal amounts at the same time. In the latter case, for a given volume flow rate of fluid into the hydraulic multistage cylinder 44, the speed of extension of the hydraulic multistage cylinder 44 may remain constant for the entire extension. The same may also be true where the hydraulic multistage cylinder 44 has only a single cylinder stage. In these cases, when determining the speed of extension by considering the engine speed and the swash plate angle, it may not be necessary first to determine the position of the ejector blade 42 because the speed of the ejector blade 42 may not be dependent on the degree of extension of the hydraulic multistage cylinder 44.

Furthermore, whilst in the above described aspects of the disclosure the hydraulic multistage cylinder 44 is powered by a variable displacement pump with a swash plate, any means by which fluid can be pumped into the hydraulic multistage cylinder 44 at a controlled fluid flow rate can be controlled may be used. For example, a fixed displacement pump may be used and the fluid flow rate controlled using a flow control valve, such as a spool valve.

Furthermore, whilst in the above described aspects the amount of fluid being pumped into the hydraulic multistage cylinder 44 and the fluid flow rate are determined from the engine speed and the swash plate angle, any alternative technique for fluid flow measurement well known to the skilled person may be used. For example, a flow meter positioned in the fluid circuit may be used for both fixed displacement and variable displacement pumps. Alternatively, if a fixed displacement pump is used, the amount of fluid pumped into the hydraulic multistage cylinder 44 and the fluid flow rate may be determined from the engine speed and the position of a flow control valve used to adjust the amount of fluid flow rate.

Whilst in the above described aspects the pump is powered by an engine, any alternative power source may be used to power the pump, for example a battery. Where the amount of fluid pumped and the fluid flow rate is determined using the engine speed, an analogous indicator of the power used to the drive the pump, for example electrical voltage and current, may be used.

Furthermore, as an alternative to the optical system for measuring the ejector blade speed, a sound based system, for example ultrasonics may instead be used. In such a system, delays and/or the Doppler effect of sound waves reflected off the ejector blade 42 may be used to determine the speed of the ejector blade 42 relative to the material container 20.

Furthermore, rather than using a hydraulic multistage cylinder 44, any extending device that can be arranged to move the ejector blade 42 relative to the bed 22 of the vehicle 10 may be used, for example any other suitable hydraulic device or pneumatic device.

Furthermore, the ejector blade 42 may be any component that is suitable for attachment to the hydraulic multistage cylinder 44 and push the material 30 towards the rear 60 of the material container 20 as the hydraulic multistage cylinder 44 extends.

Furthermore, wherever fluid volume flow rate is measured, it will be readily appreciated that fluid mass flow rate may instead be measured and fluid volume flow rate then straightforwardly derived using the fluid density.

INDUSTRIAL APPLICABILITY

The present disclosure provides a method and apparatus for setting a speed of an ejector relative to a bed of a vehicle on the basis of a measured speed of the vehicle. By setting the speed of the ejector in this way, material ejected from the vehicle may be spread evenly on the ground even when the vehicle speed changes. Consequently, control of the vehicle may be simplified for the operator since they will no longer have to focus on maintaining a steady speed, or manually adjusting the ejector blade speed in response to a change in vehicle speed, without compromising even spreading of the material.

The invention claimed is:

1. A method for controlling a material ejector system, the material ejector system comprising an ejector blade for ejecting a material from a bed of a vehicle, and a hydraulic device that is arranged to move the ejector blade relative to the bed of the vehicle, the method comprising the step of:
    setting a speed of the ejector blade relative to the bed of the vehicle on the basis of a measured speed of the vehicle and a measured speed of the ejector blade relative to the bed of the vehicle,
    wherein the measured speed of the ejector blade relative to the bed of the vehicle is determined from a volume flow rate of fluid into the hydraulic device,
    wherein the volume flow rate of fluid into the hydraulic device is controlled by a variable displacement pump that is powered by an engine, and
    wherein the volume flow rate of fluid into the hydraulic device is determined from a measured engine speed and a swash plate angle of the variable displacement pump.

2. The method of claim 1, wherein setting the speed of the ejector blade relative to the bed of the vehicle is performed further on the basis of an operator input setting.

3. The method of claim 2, wherein the operator input setting indicates a thickness to which the material ejected from the vehicle is to be spread.

4. A method for controlling a material ejector system comprising an ejector blade for ejecting a material from a bed of a vehicle, the method comprising the step of setting a speed of the ejector blade relative to the bed of the vehicle on the basis of a measured speed of the vehicle,
    wherein setting the speed of the ejector blade relative to the bed of the vehicle is performed further on the basis of a measured speed of the ejector relative to the bed of the vehicle,
    wherein the material ejector system comprises a hydraulic device, the hydraulic device being arranged to move the ejector blade relative to the bed of the vehicle,
    wherein the measured speed of the ejector blade relative to the bed of the vehicle is determined from a volume flow rate of fluid into the hydraulic device, wherein the measured speed of the ejector blade relative to the bed of the vehicle is further determined from an amount of fluid in the hydraulic device, wherein the volume flow rate of fluid into the hydraulic device is controlled by a variable displacement pump that is powered by an engine, and wherein the amount of fluid in the hydraulic device is determined from recording the measured engine speed and a swash plate angle of the variable displacement pump.

* * * * *